March 28, 1961  S. E. WESTMAN  2,976,731
PRESSURE RATIO INDICATING INSTRUMENT
Filed Oct. 15, 1957  4 Sheets-Sheet 3

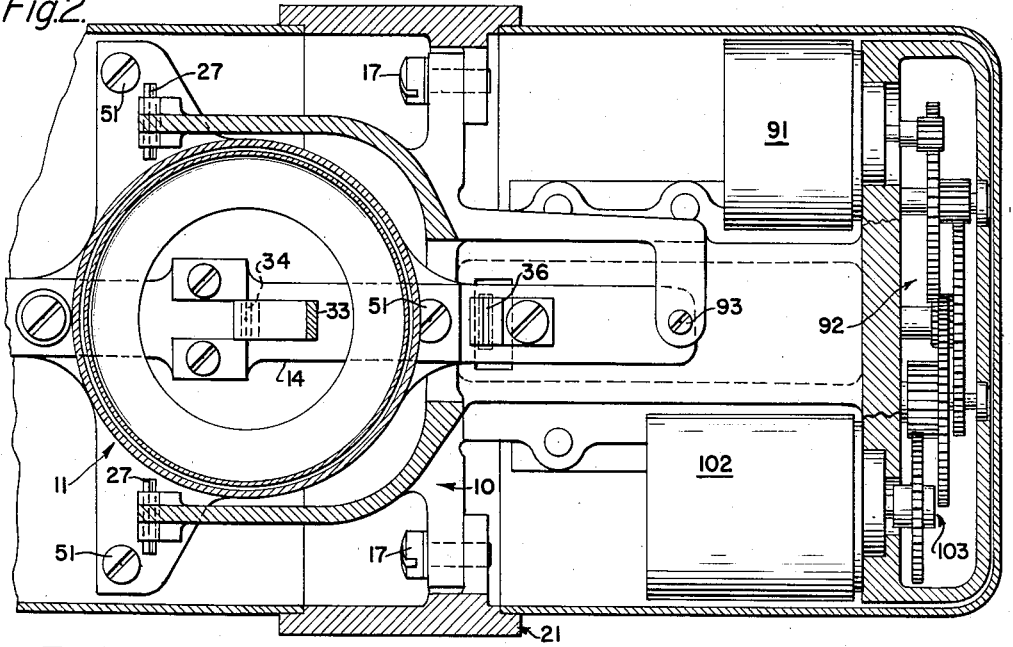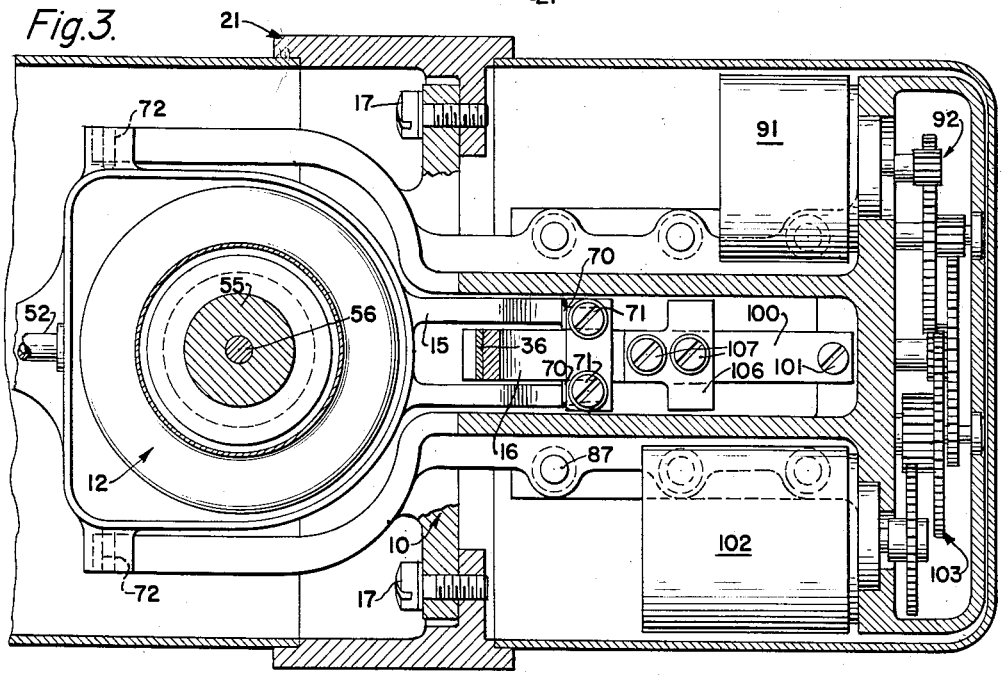

INVENTOR:
SYDNEY E. WESTMAN,
BY
Theodore E. Bieber
Attorney.

March 28, 1961 S. E. WESTMAN 2,976,731
PRESSURE RATIO INDICATING INSTRUMENT
Filed Oct. 15, 1957 4 Sheets-Sheet 4
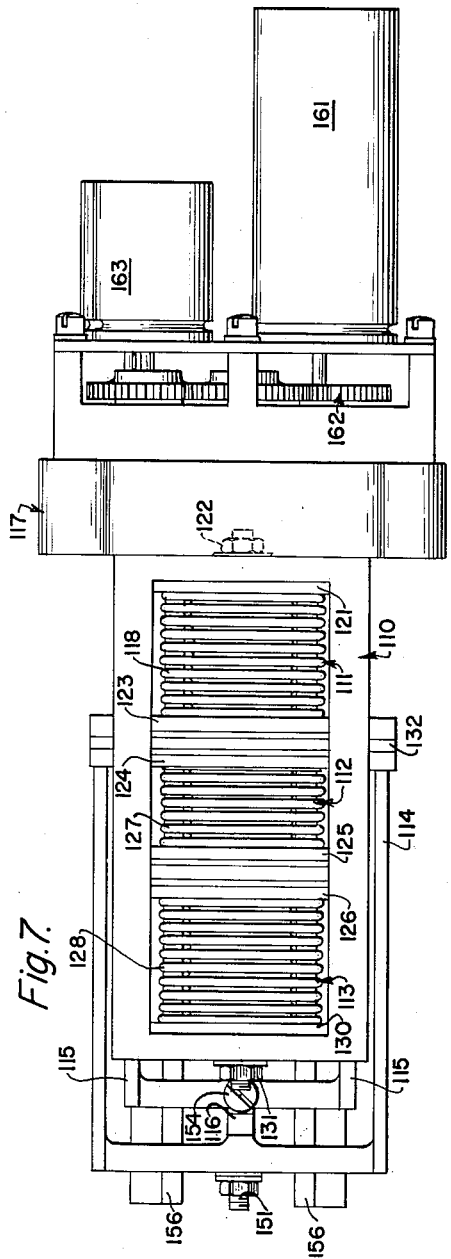
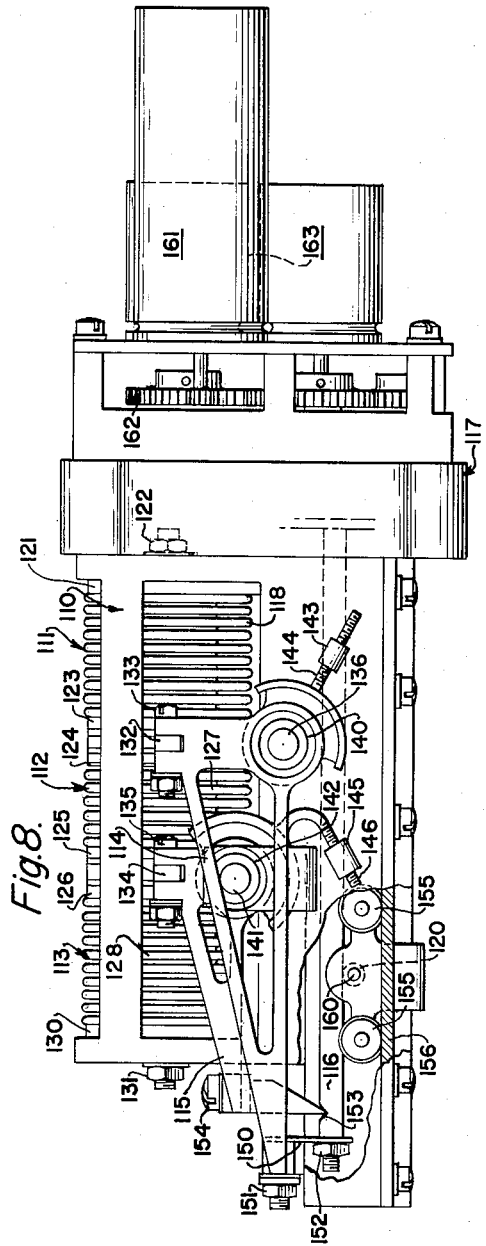
INVENTOR:
SYDNEY E. WESTMAN,
BY
Attorney.

United States Patent Office 2,976,731
Patented Mar. 28, 1961

2,976,731

PRESSURE RATIO INDICATING INSTRUMENT

Sydney Edward Westman, Inglewood, Calif., assignor to The Garrett Corporation, Los Angeles, Calif., a corporation of California Filed Oct. 15, 1957, Ser. No. 690,370

9 Claims. (Cl. 73—407)

This invention relates to improvements in indicating devices and more particularly to indicating devices for determining the ratio between two fluid pressures.

Devices which indicate the ratio of two fluid pressures are employed in aircraft for supplying a variety of data. For example, they are used to supply the ratio between static pressure and total pressure in order to determine the Mach number of flight of the aircraft. They are also useful for determining the power being developed by a gas turbine power plant by indicating the ratio of the inlet pressure to the outlet pressure of a gas turbine. While such instruments have been proposed in the past for supplying the ratio between two fluid pressures, they have several disadvantages.

Previous instruments are of various designs but the most desirable design is one which the two pressures to be ratioed are applied as forces to a normally balanced beam. The beam is equipped with a movable fulcrum so that the fulcrum point may be shifted to rebalance the beam when one or both of the forces representing the pressures changes. This design of a pressure ratio indicating instrument has several disadvantages which affect its accuracy, such as being adversely affected by acceleration forces and sensitivity to vibration and external shocks. In addition, its sensitivity is limited as well as its range of operating pressures unless the length of the beam is increased. However, any increase in the length of the beam results in a very bulky instrument.

This invention solves the above problems by providing a pressure ratio indicating instrument which utilizes two auxiliary beams having fixed pivots. Each of the pressures whose ratio is desired is applied as a force to a separate auxiliary beam. The force generated by each of the auxiliary beams is supplied to the main beam at two spaced points. The main beam, in turn, is supplied with a movable fulcrum so that it may be returned to a balanced condition when either or both of the forces of the auxiliary beams changes. The position of the movable fulcrum, of course, is directly proportional to the ratio of the two pressures whose forces are applied to the auxiliary beams. The use of auxiliary and main beams results in good sensitivity without requiring an exceedingly long main beam.

The invention overcomes the difficulties of prior pressure ratio indicating instruments by utilizing auxiliary beams having fixed pivot points in order that the auxiliary beams may be accurately balanced so that their center of gravity coincides with their fixed pivot points. This eliminates the effect of acceleration on the auxiliary beams. If desired, the main beam may be rendered insensitive to acceleration forces and other external shocks by the system shown and described in the co-pending application of Sydney E. Westman, Serial No. 403,135, filed January 11, 1954, now Patent No. 2,923,153, and entitled, "Pressure Ratio Measuring Instrument."

All of the components of the instrument are mounted on a main frame which, in turn, is secured to a mounting frame at three points. The mounting frame is secured to the aircraft, thus any distortion of the mounting frame when it is secured to the aircraft will not distort the main frame.

Accordingly, the main object of this invention is to provide a novel instrument capable of indicating the ratio between two fluid pressures which is relatively insensitive to acceleration forces and shocks.

Another object of this invention is to provide a pressure ratio indicating instrument which utilizes two auxiliary beams whose forces are connected to a main beam having a movable fulcrum.

Another object of this invention is to provide a pressure ratio indicating instrument in which all of the pressures are supplied to hermetically sealed bellows, with the instrument case being open to the ambient atmosphere.

A further object of this invention is to provide a pressure ratio indicating instrument which utilizes two auxiliary beams which have fixed pivot points and are counterbalanced so that ther center of gravity substantially coincides with their pivot points. The forces of the two auxiliary beams, in turn, are connected to a main beam which is provided with a movable fulcrum for returning it to a balanced position when the forces of the auxiliary beams change.

A further object of this invention is to provide a pressure ratio indicating instrument which utilizes two auxiliary beams for converting the pressures whose ratio is desired into forces which are supplied to a main beam having a movable fulcrum. The main beam, in turn, being supported by flexure strips to constrain its movement to one plane.

A still further object of this invention is to provide a pressure ratio measuring instrument in which all of the components are mounted on a main frame, which is secured to a mounting frame at three points.

These and other objects and advantages of this invention will be more easily understood from the following detailed description of a preferred embodiment when taken in conjunction with the attached drawings, in which:

Fig. 2 is a horizontal section taken along line 2—2 of Fig. 1 and showing the mounting of one of the auxiliary beams;

Fig. 3 is a horizontal section taken along line 3—3 of Fig. 1 and showing the mounting of the other auxiliary beam;

Fig. 7 is a top view of a modified form of the invention with the protective dust covers removed; and Fig. 8 is a front view of the modified form shown in Fig. 7.

Figure 1:
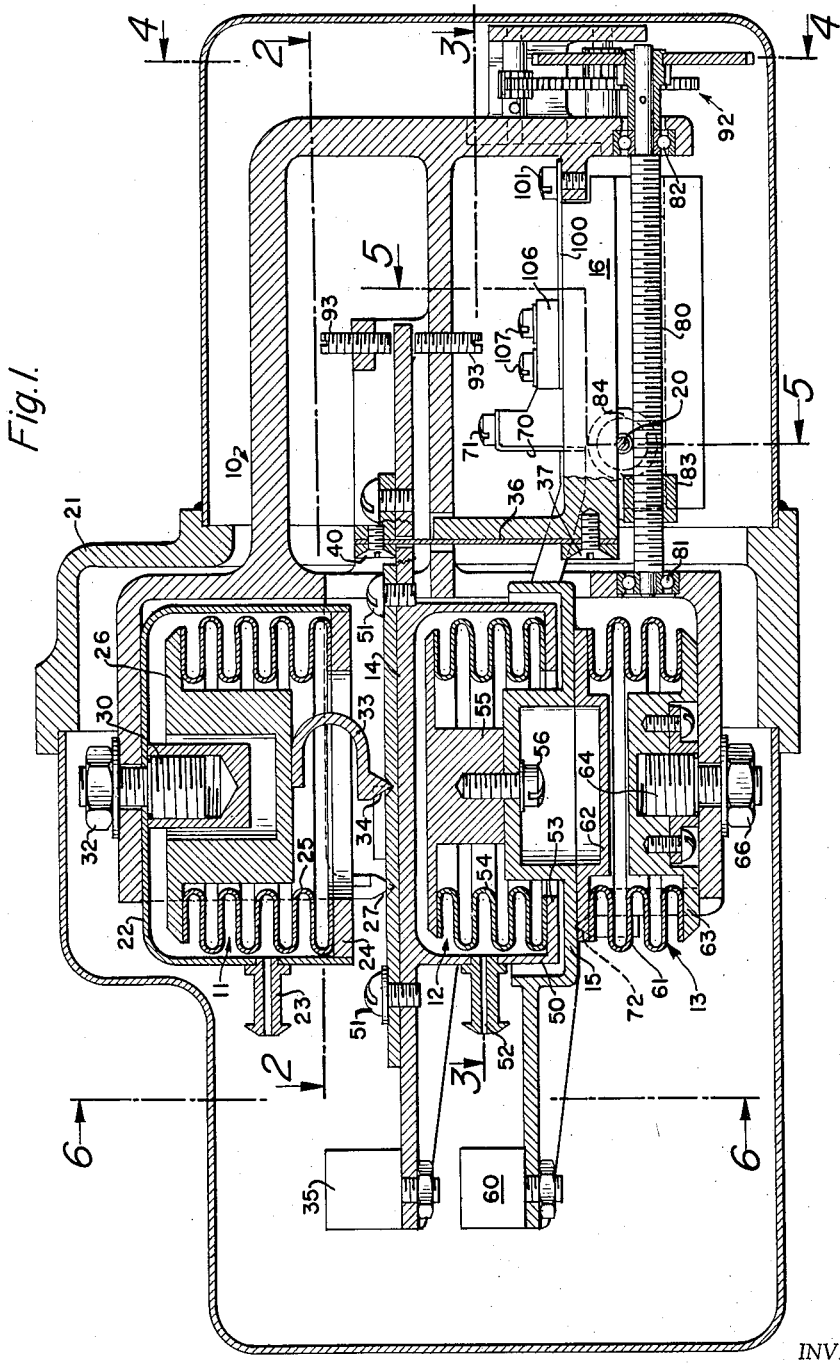
Fig. 1 is a longitudinal cross-section of a pressure ratio indicating instrument constructed according to this invention.
Figure 4:
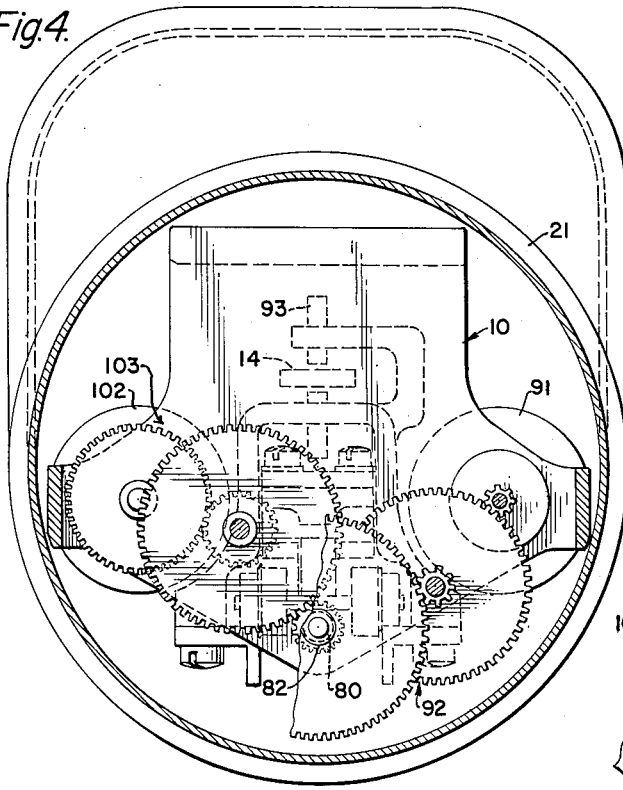
Fig. 4 is a right-hand end view of the instrument looking along line 4—4 of Fig. 1.

Referring to Fig. 1, there is shown a pressure ratio indicating instrument having a bellows assembly 11 connected to a first auxiliary beam 14. A second bellows assembly 12 is mounted below and coaxially with the axis of the first bellows assembly and is connected to both the first auxiliary beam 14 and a second auxiliary beam 15. A third bellows 13 is mounted coaxially with the first two and connected to the second auxiliary beam 15. For the instrument shown in Fig. 1, the upper bellows assembly 11 is supplied with a fluid pressure representing the lower of the two pressures whose ratio is desired with the center bellows assembly 12 being supplied with a fluid pressure representing the higher pressure, while the lowest bellows is evacuated. The forces generated by the two auxiliary beams are supplied to two spaced points on the main beam 16. The main beam 16, in turn, has a movable fulcrum 20 so that it can be maintained in a balanced position when the forces generated by the auxiliary beams change.

Figure 6:
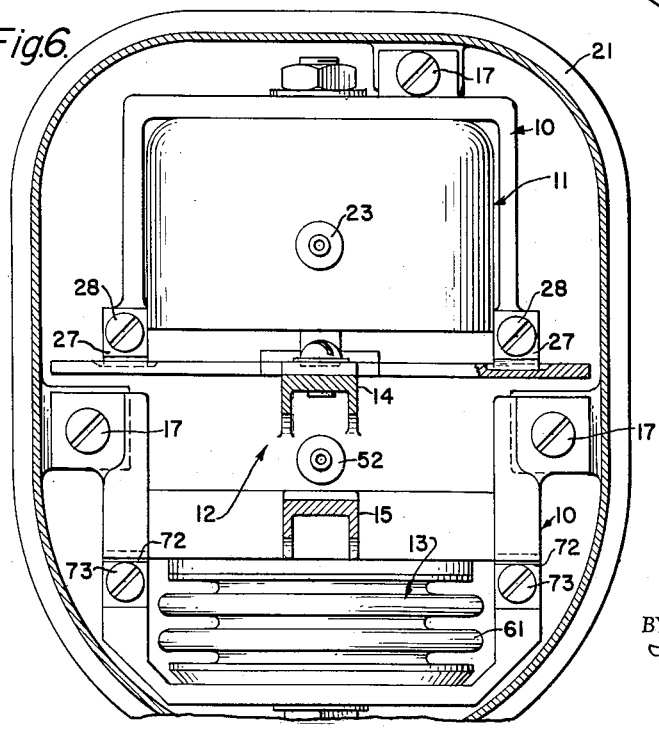
Fig. 6 is a left-hand end view looking along line 6—6 of Fig. 1.

All of the various components and parts of the instrument are mounted on a rigid main frame 10, which, in turn, is connected to an instrument mounting frame 21, by means of three screws 17 which pass through openings in the main frame 10 and thread into the mounting frame 21, as shown in Fig. 6. The instrument mounting frame is adapted to be mounted in the aircraft by any desired means, not shown. The use of a three-point suspension between the main frame 10 and the mounting frame 21 allows the mounting frame 21 to be distorted in mounting the instrument without distorting the main frame 10. Any distortion of the main frame 10 would introduce inaccuracies in the instrument.

The upper bellows assembly 11 is supplied with an inverted cup-shaped outer housing 22 which has an inlet connection 23 extending from its outer surface. One of the pressures whose ratio is desired is connected to this inlet by means of flexible tubing or the like, not shown in Fig. 1. The lower end of the outer case 22 is supplied with a relatively heavy inwardly extending flange 24 to which the lower end of the bellows 25 is hermetically attached by any desired means, such as welding or the like. The upper end of the bellows 25 is connected to a cup-shaped header 26. A stud 30 threads into a central opening in an enlarged section of the outer case 22 and is used for attaching the bellows assembly 11 to the main frame 10. The bellows assembly is secured to the main frame by means of a nut 32 which threads over a reduced end portion of the stud 30.

The movement of the bellows 25 is transmitted to the first auxiliary beam 14 by means of a C-shaped force link 33 which is secured to the lower surface of the header 26 by any desired means, such as by welding or the like. The force link 33 is provided with a knife edge 34 which engages a V-shaped groove formed in the first auxiliary beam 14. The force link is disposed so that the edge of the knife edge coincides with the axis of the bellows 25. The auxiliary beam 14, in turn, is pivoted about the two pivots 27, which are shown as knife edges, although other types may be used. The pivots 27 are secured to the main frame 10 by means of machine screws 28, as shown in Fig. 6. The auxiliary beam 14 is provided with a counterweight 35 to compensate for the weight of the beam to the right of the pivot 27 and for a portion of the bellows assemblies 11 and 12. The force generated by the auxiliary beam 14 is connected to the main beam 16 by means of a flexure strip 36. The upper end of the flexure strip 36 is secured to a mounting clip on the auxiliary beam by means of a machine screw 40, while the lower end is secured to the left end of the main beam 16 by means of a machine screw 37.

The bellows assembly 12 is provided with an inverted cup-shaped outer housing 50, which is secured to the first auxiliary beam 14 by means of two machine screws 51 which pass through the beam and thread into the outer housing 50. The outer housing 50 is provided with an inlet opening 52 so that the second of the two pressures whose ratio is desired may be connected to the interior of the housing 50 by means of a flexible tube or the like, not shown in Fig. 1. The lower end of the outer housing 50 is provided with a relatively heavy inwardly projecting flange 53 to which the lower end of the bellows 54 is hermetically fastened by any desired means, such as welding or the like. The upper end of the bellows 54 is hermetically fastened to a header 55 by any desired means, such as welding or the like. The bellows is secured to the second auxiliary beam 15 by means of machine screw 56 which passes through the beam and threads into a central opening in the header 55. The bellows assembly 12 should be mounted so that its longitudinal axis coincides with the knife edge 34 and the longitudinal axis of the bellows assembly 11. The second auxiliary beam 15 is provided with a counterweight 60 at its extreme left-hand end to counterbalance the weight of the beam to the right of the knife edge pivot 72 and a portion of the bellows assemblies 12 and 13. The auxiliary beam 15 is pivoted about two pivots 72 which are shown as knife edges. The pivots 72 are secured to the main frame 10 by means of machine screws 73, as seen in Fig. 6. The right-hand end of the second auxiliary beam is secured to the main beam 16 by means of two spaced flexure strips 70, as seen in Fig. 3. Each of the flexure strips 70 is secured to the main beam by means of a machine screw 71, while the other end may be secured to the second auxiliary beam 15 by any desired means, not shown.

The ratio of the distance between the pivot 27 and the knife edge 34, to the distance between the knife edge and the point at which the flexure strip 36 is attached to the first auxiliary beam 14, should be equal to the ratio of the distance between the knife edge 72 and the longitudinal axis of the bellows assembly 12 to the distance between the longitudinal axis of the bellows assembly 12 and the point at which the flexure strip 70 is attached to the second auxiliary beam 15. The ratio of these distances can easily be seen in Fig. 1, and the ratio of these distances for the first and second auxiliary beams must be maintained substantially equal so that the force passed along to the main beam 16 by each of the auxiliary beams, due to the pressure admitted to the bellows assemblies 11 and 12, is directly proportional to each of the pressures. If these ratios are not maintained substantially equal, one of the forces will reflect an increase due to the mechanical advantage of one beam over the other beam, thus impairing the accuracy of the instrument.

The lower bellows assembly 13 which is evacuated is provided with a bellows 61 whose upper end is hermetically fastened to a header 62. The header 62, in turn, is secured to the second auxiliary beam 15 by any desired means, not shown. The lower end of the bellows 61 is hermetically secured to a header 63 which in turn, is secured to the main frame 10 of the instrument by means of a stud 64, which threads into a central opening in the header 63. The stud 64 is secured to the main frame 10 by means of a nut 66, which threads over the end of the stud. The bellows assembly 13 should be mounted so that its longitudinal axis is aligned with the longitudinal axes of the bellows assemblies 11 and 12.

From the above description it can be seen that if the engine exhaust pressure is supplied to the bellows assembly 12 and the compressor inlet pressure supplied to the bellows assembly 11 while maintaining the bellows assembly 13 evacuated, the auxiliary beams will provide forces proportional to the following pressures: auxiliary beam 14 will provide a force proportional to the difference between the engine exhaust pressure and the compressor inlet pressure, while the auxiliary beam 15 will supply a force proportional to the engine exhaust pressure. When these two forces are balanced by moving the fulcrum of the main beam 16, the ratio of the distances from the fulcrum to the point of application of these forces to the main beam will be directly proportional to the ratio of engine exhaust pressure to compressor inlet, as will be more fully explained below.

Figure 5:
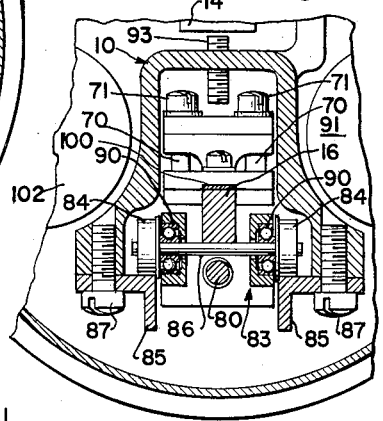
Fig. 5 is a partial vertical section taken along line 5—5 of Fig. 1 and showing the means used for mounting the movable fulcrum.

The movable fulcrum 20 is positioned by means of a lead screw 80, which is rotatably supported by means of ball bearings 81 and 82 at opposite ends. The movable fulcrum consists of a carriage 83, which is supported for movement on parallel tracks 85 by means of flanged wheels 84, as shown in Fig. 5. The parallel tracks 85 are secured to the main frame 10 by means of a plurality of machine screws 87. The wheels 84 are rotatably mounted on an axle 86 by means of suitable bearings, not shown, which, in turn is rotatably supported in the carriage by means of ball bearings 90. The axle 86, in addition to supporting the wheels 84, acts as the fulcrum or pivot point 20 for the main beam 16.

The lead screw 80 is driven by means of a motor 91 and a gear train 92. The motor 91 is energized from any suitable power source and is controlled by means of two adjustable switches 93 which detect any unbalance of the first auxiliary beam 14, as seen in Figs. 1 and 2.

The main beam 16 is constrained at the right-hand end by means of a flexure strip 100, which is secured to the main beam by means of a clamping plate 106 and machine screws 107, and secured to the main frame 10 by means of a machine screw 101. The left-hand end of the beam is similarly constrained by a flexure strip, not shown. The position of the movable fulcrum 20 is indicated by a synchro transmitter 102 which is connected to the lead screw 80 by means of a gear train 103. The output of the synchro transmitter 102 can be connected to any desired indicating device to present the position of the movable fulcrum 20 in any desired manner, such as a direct ratio or engine horsepower, or other means.

When the above-described pressure ratio indicating instrument is operated by connecting the two pressures whose ratio is desired to the bellows assemblies 11 and 12 respectively, the two auxiliary beams 14 and 15 will generate forces $F_1$ and $F_2$ respectively. Force $F_1$ will be proportional to the higher pressure $P_2$ which is supplied to the bellows assembly 12 minus the lower pressure $P_1$ which is supplied to the bellows assembly 11. The force $F_2$ will be proportional to $P_2$. When these two forces are supplied to the main beam 16, the beam balance will be represented by the equation $F_1 a = F_2 (a-c)$ in which "a" is equal to the distance from the movable fulcrum 20 to the point at which the flexure strip 36 is attached to the main beam, and "c" is equal to the distance from the point at which flexure strip 70 is attached, to the point at which the flexure strip 36 is connected to the main beam. When the pressures $P_1$ and $P_2$ are substituted in the above equation, it reduces to $$\frac{a}{c} = \frac{P_2}{P_2 - (P_2 - P_1)} = \frac{P_2}{P_1}$$

Thus, the distance "a" indicates the ratio between the pressures $P_2$ and $P_1$.

The modified form of the invention shown in Figs. 7 and 8 incorporates bell cranks instead of the auxiliary beams shown in the other form of the invention. The use of bell cranks permits the common longitudinal axis of the bellows to be parallel with the axis of the main beam, which results in a much more compact instrument. While the bell cranks permit the construction of a compact instrument, they still result in a sensitive instrument since they multiply any movement of the bellows. This results in a magnified movement of the main beam which is easy to detect.

The three bellows assemblies 111, 112 and 113 are mounted so that their longitudinal axes are aligned. The forces generated by the bellows assemblies are transmitted to one arm of each of the bell cranks 114 and 115, while the other arm of each bell crank is connected to the main beam 116. The main beam 116 is provided with a movable fulcrum 120 which is positioned so as to rebalance the main beam when it is unbalanced by a change in the forces generated by the bellows.

The bellows 118 of the assembly 111 is hermetically sealed to a header 121 at its right-hand end. The header, in turn, is secured to the main frame 110 of the instrument by means of a stud which projects through an opening formed in the main frame 110 and a nut 122 which threads over the end of the stud. The other end of the bellows 118 is sealed to a second header 123 while opposite ends of the bellows 127 of the assembly are hermetically sealed to headers 124 and 125, respectively.

One end of the bellows 128 of assembly 113 is hermetically sealed to a header 126 and the opposite end is sealed to the header 130. The header 130 is secured to the main frame 110 by means of a stud which passes through an opening in the main frame and a nut 131 which threads over the end of the stud. The main frame 110 is secured to the mounting frame 117 of the instrument by a three-point suspension system similar to that shown and described in the other form of the invention.

The forces generated by the bellows assemblies 111, 112, and 113, are supplied to two links 132 and 134, which are secured to the headers 123, 124 and 125 and 126, respectively, by any desired means, not shown. The opposite ends of the link 132 are connected to one arm of the bell crank 114 by means of a bolt 133 and nut. The opposite ends of the link 134 are connected by a bolt 135 and nut to one arm of the bell crank 115. The bell crank 114 is rotatably mounted on a stub shaft 136 which projects from the main frame 110 by means of a ball bearing 140. The bell crank 115 is rotatably mounted on a stub shaft 141 which also projects from the main frame by means of a ball bearing 142. The mass of the bell crank 114 is counterbalanced about the axis of the shaft 136 by means of a counterweight 143 which threads over a small threaded shaft 144, which projects radially from the bell crank. The bell crank 115 is similarly counterbalanced by a counterweight 145 which threads over a small threaded shaft 146. Other means may also be used to counterbalance the bell crank such as the means shown and described in the application referenced above.

The other arm of the bell crank 114 is secured to the end of the main beam 116 by means of a flexure strip 150 which is secured to the bell crank by a screw 151 and nut, and to the main beam by a nut 152 which threads over the threaded end portion of the main beam. The force generated by the bell crank 115 is transmitted to the main beam 116 by means of a knife edge 153. The knife edge 153 is secured to the bell crank by means of small machine screws 154 which pass through openings in the bell crank and thread into the knife edge.

The movable fulcrum 120 is provided with a carriage which is mounted on parallel tracks 156 by means of flanged wheels 155. The carriage is provided with a fulcrum shaft 160 which is rotatably mounted in the carriage frame by means of bearings not shown. The carriage shaft is moved in a longitudinal direction by means of a lead screw similar to the lead screw 80 shown in Fig. 1. The lead screw is driven by a motor 161 and a gear train 162, also similar to the motor and gear train shown in the other embodiment of this invention. A servo 163 is connected to the gear train 162 so as to supply an electrical output which is proportional to the position of the movable fulcrum 120.

The operation of the embodiment of the invention shown in Figs. 7 and 8 is the same as that described above. The higher of the two pressures whose ratio is desired is supplied to the bellows 127 through a suitable connection, not shown in Fig. 7, while the lower of the two pressures is supplied to the bellows 118 through a suitable connection, not shown. The bellows 128 is evacuated and thus the bell crank 114 generates a force $F_1$, while the bell crank 115 generates a force $F_2$. These forces are the same as the forces $F_1$ and $F_2$ described above. The remainder of the operation described above applies equally to this embodiment of the invention so that the position of the fulcrum 120 indicates the ratio between $P_2$ and $P_1$, where $P_2$ represents the larger of the two pressures and $P_1$ represents the lower of the two pressures.

While but one preferred embodiment of this invention has been described in detail, many modifications and improvements in the invention, within its broad spirit and scope, will occur to those skilled in the art to which it pertains.

I claim:

1. An instrument for determining the ratio between two pressures, comprising: a housing; an evacuated bellows mounted in said housing and connected to a first auxiliary beam; said first auxiliary beam having a fixed pivot point and in addition being connected to a main beam; a first pressure responsive bellows connected to said first auxiliary beam at a point aligned with the point of attachment of said evacuated bellows, said first bellows in addition being connected to a second auxiliary beam; said second auxiliary beam having a fixed pivot point and in addition being connected to said main beam; a second pressure responsive bellows mounted in said housing and connected to said second auxiliary beam at a point aligned with the point of attachment of said first bellows; means forming a movable fulcrum for said main beam and means responsive to the unbalance of said main beam for moving said movable fulcrum to rebalance said main beam.

2. An instrument for determining the ratio of two pressures, comprising: a housing; a main beam disposed in said housing; a carriage means mounted in said housing and disposed to move along the longitudinal axis of said main beam, a rotatable pivot carried by said carriage for supporting said main beam; an evacuated bellows mounted in said housing and connected to a first auxiliary beam; said first auxiliary beam having a fixed pivot point, and in addition being connected to said main beam; a second bellows responsive to the higher of the two pressures disposed in said housing and connected to said first auxiliary beam at a point aligned with the point at which said evacuated bellows is connected to said first auxiliary beam, said second bellows also being connected to a second auxiliary beam; said second auxiliary beam having a fixed pivot point and in addition being connected to said main beam; a third bellows responsive to the other of the two pressures disposed in said housing and connected to said second auxiliary beam at a point aligned with the point at which the second bellows is connected to said auxiliary beam; and positioning means responsive to the unbalance of said main beam for moving said carriage to rebalance said main beam.

3. An instrument for determining the ratio between two pressures, comprising: a housing; a first bellows disposed in said housing; a second bellows disposed on one side of said first bellows and aligned therewith, a third bellows disposed on the other side of said first bellows and aligned therewith; said second bellows and one side of said first bellows being connected to a common point on a first auxiliary beam; said third bellows and the other side of said first bellows being connected to a common point on a second auxiliary beam; the higher of the two pressures being connected to said first bellows and the other of the two pressures being connected to said second bellows, said third bellows being evacuated; said first and second auxiliary beams being connected to a main beam; means forming a movable pivot for said main beam; and positioning means responsive to the unbalance of said main beam for moving said pivot in a direction to rebalance said beam.

4. An instrument for determining the ratio of two pressures, comprising: three bellows mounted on a main frame with their longitudinal axes substantially coaxial, one of said bellows being evacuated, the second of said bellows being responsive to one of the two pressures and the third of said bellows being responsive to the other of the two pressures; means for applying the difference in the forces generated by said first and second bellows to one arm of a first bell crank mounted on said main frame and additional means for applying the difference in the forces generated by said second and third bellows to one arm of a second bell crank mounted on said main frame; connecting means for applying the force generated by the other arm of said first bell crank to a main beam mounted on said main frame and additional connecting means for applying the force generated by the other arm of said second bell crank to said main beam at a point spaced from the point at which force of said first bell crank is applied; a movable fulcrum for said main beam; and means for positioning said fulcrum to maintain said main beam balanced.

5. An instrument for determining the ratio of two pressures, comprising: three bellows mounted on a main frame with their longitudinal axes coaxial, one of said bellows being evacuated, the second of said bellows being responsive to one of the two pressures and the third of said bellows being responsive to the other of the two pressures; means for applying the difference in the forces generated by said first and second bellows to one arm of a first bell crank mounted on said main frame and additional means for applying the difference in the forces generated by said second and third bellows to one arm of a second bell crank mounted on said main frame; connecting means for applying the force generated by the other arm of said first bell crank to a main beam mounted on said main frame and additional connecting means for applying the force generated by the other arm of said second bell crank to said main beam at a point spaced from the point at which force of said first bell crank is applied; a foldable fulcrum for said main beam; means for positioning said fulcrum to maintain said main beam balanced; and a mounting frame, said main frame being connected to said mounting frame by a three-point suspension.

6. An instrument for determining the ratio of two pressures, comprising: a main frame; two auxiliary beams pivotally mounted on said main frame; three bellows mounted on said main frame with their longitudinal axes aligned; one of said bellows being responsive to one of the pressures, a second of said bellows being responsive to the other of said pressures and the third bellows being evacuated; connecting means for applying the difference in the force generated by said first and second bellows to one of said auxiliary beams and additional connecting means for applying the difference in the force generated by said second and third bellows to the other of said auxiliary beams; a counterweight attached to each of said auxiliary beams to counterbalance each auxiliary beam and the movable portion of the bellows connected to each auxiliary beam; a main beam mounted on said main frame and having a movable fulcrum; means for applying the force generated by each auxiliary beam to spaced points on said main beam; and means for positioning said fulcrum to maintain said main beam in a balanced position.

7. An instrument for determining the ratio of two pressures, comprising: a main beam; a fulcrum about which said beam may pivot, said fulcrum being movable in opposite directions longitudinally of said beam; two auxiliary beams; fixed pivots for said auxiliary beams; means connecting said auxiliary beams at points remote from their pivots to said main beam, the points of connection of said auxiliary beams to the main beam being spaced longitudinally of the main beam; means applying a force proportional to the difference between said two pressures to one of said auxiliary beams; means applying a force proportional to one of said pressures to the other of said auxiliary beams; means responsive to unbalance of said main beam for moving said fulcrum to restore main beam balance; and means interpreting the position of said fulcrum to determine the pressure ratio.

8. An instrument for determining the ratio of two pressures, comprising: a main beam; a fulcrum about which said main beam may pivot, said fulcrum being movable in opposite directions longitudinally of said beam; two auxiliary beams; fixed pivots for said auxiliary beams; means connecting said auxiliary beams at points remote from their pivots to said main beam at points spaced longitudinally of the main beam; an evacuated bellows connected between one of said auxiliary beams and a fixed part; a second bellows responsive to one of said pressures connected between the other of said auxiliary beams and a fixed part; a third bellows responsive to the other of said pressures connected between said auxiliary beams; means responsive to unbalance of said main beam for moving said fulcrum to restore beam balance; and means interpreting the position of said fulcrum to determine the pressure ratio.

9. An instrument for determining the ratio of two pressures, comprising: a balancing beam; a fulcrum about which said beam may pivot, said fulcrum being movable in opposite directions longitudinally of said beam; a pair of levers; fixed pivots for said levers; means connecting said levers to said beam at points spaced longitudinally of said beam; means applying a force proportional to the difference between said two pressures to one of said levers; means applying a force proportional to the larger of said pressures to the other of said levers; means responsive to unbalance of said beam for moving said fulcrum to restore beam balance; and means interpreting the position of said fulcrum to determine the pressure ratio.

References Cited in the file of this patent
UNITED STATES PATENTS

| | | |
|---|---|---|
| 2,216,589 | Grooms | Oct. 1, 1940 |
| 2,314,152 | Mallory | Mar. 16, 1943 |
| 2,527,171 | Allwein | Oct. 24, 1950 |

FOREIGN PATENTS

| | | |
|---|---|---|
| 1,133,508 | France | Mar. 28, 1957 |

OTHER REFERENCES

NACA Wartime Report L–423: "NACA Mach Number Indicator for Use in High Speed Tunnels," originally issued July 1943, declassified 1947 (6 pp. text, 2 pp. dwg., Fig. 3 relied upon).

UNITED STATES PATENT OFFICE
CERTIFICATION OF CORRECTION

Patent No. 2,976,731                      March 28, 1961

Sydney Edward Westman

It is hereby certified that error appears in the above numbered patent requiring correction and that the said Letters Patent should read as corrected below.

Column 8, line 22, for "foldable" read -- movable --; line 50, after "said", first occurrence, insert -- main --.

Signed and sealed this 22nd day of August 1961.

(SEAL)
Attest:

ERNEST W. SWIDER                       DAVID L. LADD
Attesting Officer                       Commissioner of Patents